(12) United States Patent
McGrew (10) Patent No.: US 6,327,260 B1
(45) Date of Patent: Dec. 4, 2001

(54) CONTROLLED ROUTING TO A PLURALITY OF SIGNALING INTERFACES AT A SINGLE TELEPHONIC SWITCH

(75) Inventor: Michael A. McGrew, Columbus, OH (US)

(73) Assignee: Lucent Technologies, Inc., Murray Hill, NJ (US)

( * ) Notice: Subject to any disclaimer, the term of this patent is extended or adjusted under 35 U.S.C. 154(b) by 0 days.

(21) Appl. No.: 09/063,175

(22) Filed: Apr. 20, 1998

(51) Int. Cl.[7] .......................................... H04J 3/02
(52) U.S. Cl. ........................ 370/385; 370/217; 370/225; 370/401; 370/410; 370/467; 379/229
(58) Field of Search ...................... 370/217, 225, 370/227, 228, 352, 360, 384, 385, 412, 371, 395, 401, 402, 465, 467, 354, 356, 410; 371/20.1, 20.2, 20.6; 379/229, 230, 231, 221

(56) References Cited

U.S. PATENT DOCUMENTS

| | | | |
|---|---|---|---|
| 4,154,983 | * | 5/1979 | Pedersen ............................... 370/352 |
| 4,885,738 | * | 12/1989 | Bowers et al. ........................ 370/371 |
| 5,592,466 | * | 1/1997 | Buczny et al. ........................ 370/217 |
| 5,694,463 | * | 12/1997 | Christie et al. ....................... 379/230 |
| 5,864,563 | * | 1/1999 | Ratcliffe ............................... 371/20.1 |
| 6,061,432 | * | 5/2000 | Wallace et al. ....................... 379/230 |
| 6,104,803 | * | 8/2000 | Weser et al. ......................... 379/230 |
| 6,181,710 | * | 1/2001 | Cooper et al. ....................... 370/467 |

OTHER PUBLICATIONS

AT&T Network Systems Common Channel Signaling 7 Information Guide, #256–002–100, Dated Apr. 1990.

* cited by examiner

Primary Examiner—Douglas Olms
Assistant Examiner—Shick Hom (57) ABSTRACT

A telecommunication system network having a public telephonic network switch which communicates signaling information in accordance with Signaling System 7 protocol with a signal transfer point. A primary message signaling interface at the public telephonic network switch receives signaling information under normal operating conditions via a link set from the signal transfer point. Another secondary message signaling interface at the same network switch receives signaling information via another link set parallel to the one link set from the signal transfer point upon the occurrence of certain preselected conditions and in which both link sets terminate on the same pair of signaling point codes.

27 Claims, 4 Drawing Sheets

CONTROLLED ROUTING TO A PLURALITY OF SIGNALING INTERFACES AT A SINGLE TELEPHONIC SWITCH

BACKGROUND OF THE INVENTION

This invention relates to telecommunications networks which transmit signaling information to network elements, and more particularly, to telecommunications packet switched networks employing Signaling System 7 message transfer part protocol to transmit signaling information between a Signal Transfer Point and a telephonic switch of the network.

Telecommunications systems utilize networks of computer controlled devices, more commonly known as network elements, to facilitate signaling between the telecommunications service provider's central office and the end user. Signaling relates to the transmission of messages between network elements over a control data signaling network which is separate from the voice communication circuits. Examples of telecommunication message signaling include data to provide call set-up, common channel signaling and other control signaling between network switching elements over a signaling channel separate from the voice network. Certain communications standards or protocol are required for signaling in telecommunications networks.

Recently, the Signaling System No. 7 protocol has been mandated for out-of-band signaling communication involving telecommunication network elements and has been implemented worldwide. See Travis Russell, "Signaling System 7", ISBN 0-07-054991-5, McGraw-Hill, Inc. 1995. Signaling System No. 7 (SS7) network elements are each uniquely identified by a Message Transfer Part (MTP) Signaling Point Code (PC). Network administrators set up routes through a SS7 network so that the network elements can send Message Signal Units (MSUs) from any network element to any other network element in the network.

Two types of network elements are telephonic switches and Signal Transfer Points (STPs). Telephonic switches control the telephone and service traffic that is provided by the telecommunications operating company. A key to a telecommunication service provider's success is for their public switched telephone network (PSTN) switches to provide continuous service. It is critical that the service provider's customers have the ability to communicate through the telecommunications network via the telephonic switch associated with the particular customer. Moreover, there are federal (United States) and world International Telecommunications Union Telecommunications (ITU-T) reporting requirements for SS7 failures ("outages") above a certain threshold. The Signaling Transfer Points (STPs) act as signaling hubs for concentrating signaling links so the telephonic switches do not need to be fully interconnected, thereby reducing network costs while also acting as access points to network services and gateways to other networks.

Figure 1:
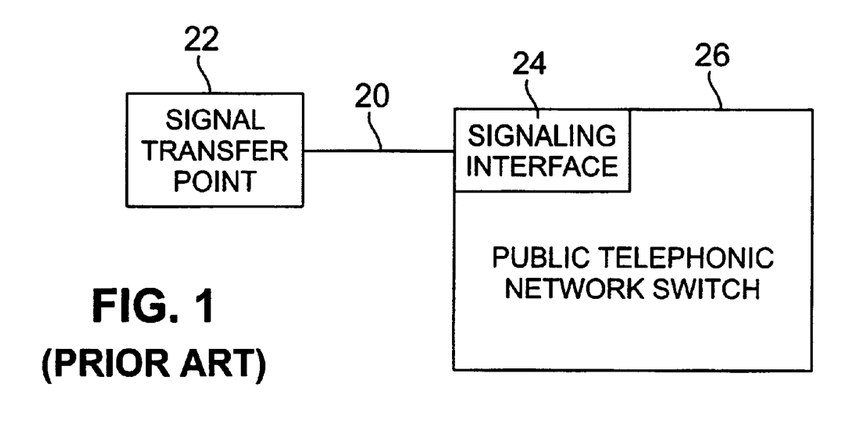
FIG. 1 is a block diagram of a known system computer network having a signal transfer point and a public switched telephone network switch.
Figure 2:
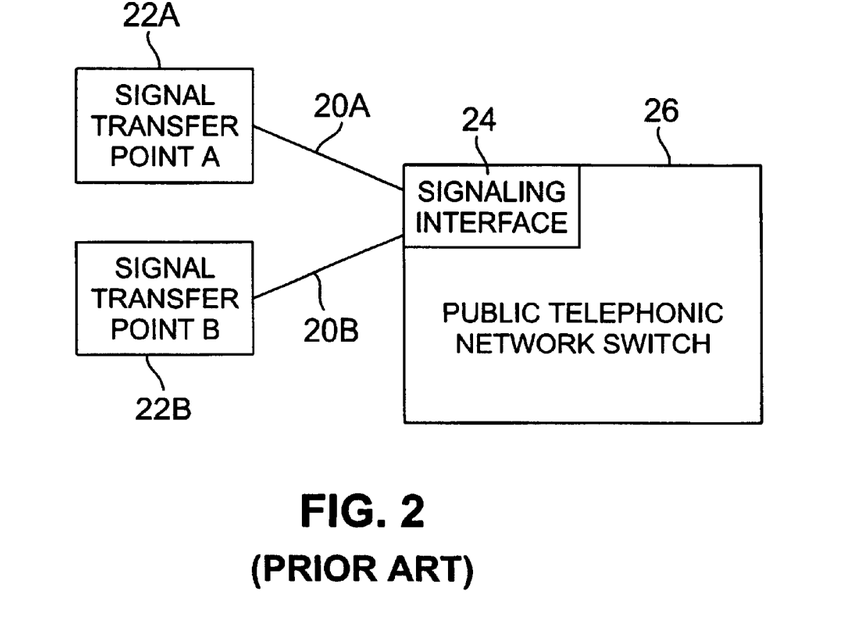
FIG. 2 is a block diagram of a known system computer network illustrating a public telephonic network switch having network access via link sets to mate signal transfer points.

Network elements, such as STPs and telephonic switches, are interconnected by link sets, or a group of signaling links that all terminate on the same set of Signaling Point Codes (elements associated with the point code, PC). Each signaling link is identified by three parameters, the two Point Codes (PCs) at each end of the link and a Signaling Link Selection (SLS) code. Referring now to FIG. 1, a conventional deployment of a single link set 20 interconnecting an STP 22 and the single signaling interface 24 associated with the telephonic switch 26 is shown. Each network element (STP 22 or switch 26) is identified by its signaling point code assignment. Referring to FIG. 2, an SS7 network diagram illustrating link set deployment with a switch 26 and a pair of mate STPs 22A, 22B is shown. Each STP 22A, 22B has only one link set 20A, 20B, respectively, interconnecting the single signaling interface 24 at the telephonic switch. Because STPs 22 fully interconnect telephonic switches 26, it is important to the telecommunications service provider, and invariably to its customers, that the STPs must not fail. Due to network redundancy in that STPs are generally provided in mated pairs, FIG. 2, one STP 22A can take over for its failed mate 22B.

Disadvantageously, however, the telephonic switch is dependent on its lone single signaling interface 24 for its total SS7 network communication capabilities. If a hardware or software failure exists, or a generic software update is required, it is almost certain that a signaling outage will occur at the telephonic switch. Once this happens the switch becomes isolated and telephonic communication is lost at all telephonic units associated with the switch during the isolation period. Signaling communication at a switch following SS7 protocol is dependent and thus, is limited by its lone signaling interface which unfortunately leads to potential switch isolation upon operational failures, upgrades to the system or upon field events. Therefore, there is a need in the art to prevent disruption of telecommunication signaling and to increase the signaling availability and reliability at the network telephonic switch.

SUMMARY OF THE INVENTION

The problems noted above are solved in accordance with the invention and a technical advance is achieved in the art, by providing a plurality of message signaling interfaces with the same point code at a single public telephonic network switch. Signaling information is transmitted from various network elements to one message signaling interface at the switch during normal operation and under certain preselected conditions the signaling information is sent from the network element to another message signaling interface at the same public telephonic network switch. The inventive apparatus and method significantly reduces the possibility of the network switch becoming isolated by maintaining continuous telecommunication signaling at the network switch thereby increasing its availability and reliability.

In particular, signaling information is communicated from a single signal transfer point within the telecommunication network across one link set to a message signaling interface at the telephonic network switch under normal operation. In response to certain preselected conditions occurring within the network, the signaling information transmitted from the single signal transfer point is re-routed across another link set to another message signaling interface employed as a secondary signaling interface at the same telephonic network switch.

In some cases, the signaling information is transmitted from the signal transfer point across the other link set to the other/secondary message signaling interface upon a failure or initialization at the primary message signaling interface. Additionally, upon a return to normal operation, the signaling information may selectively be transmitted back across the one link set to the primary message signaling interface.

BRIEF DESCRIPTION OF THE DRAWINGS

The foregoing objects and advantageous features of the invention will be explained in greater detail and others will be made apparent from the detailed description of the preferred embodiment of the present invention which is given with reference to the several figures of the drawing, in which.

DETAILED DESCRIPTION

Figure 3:
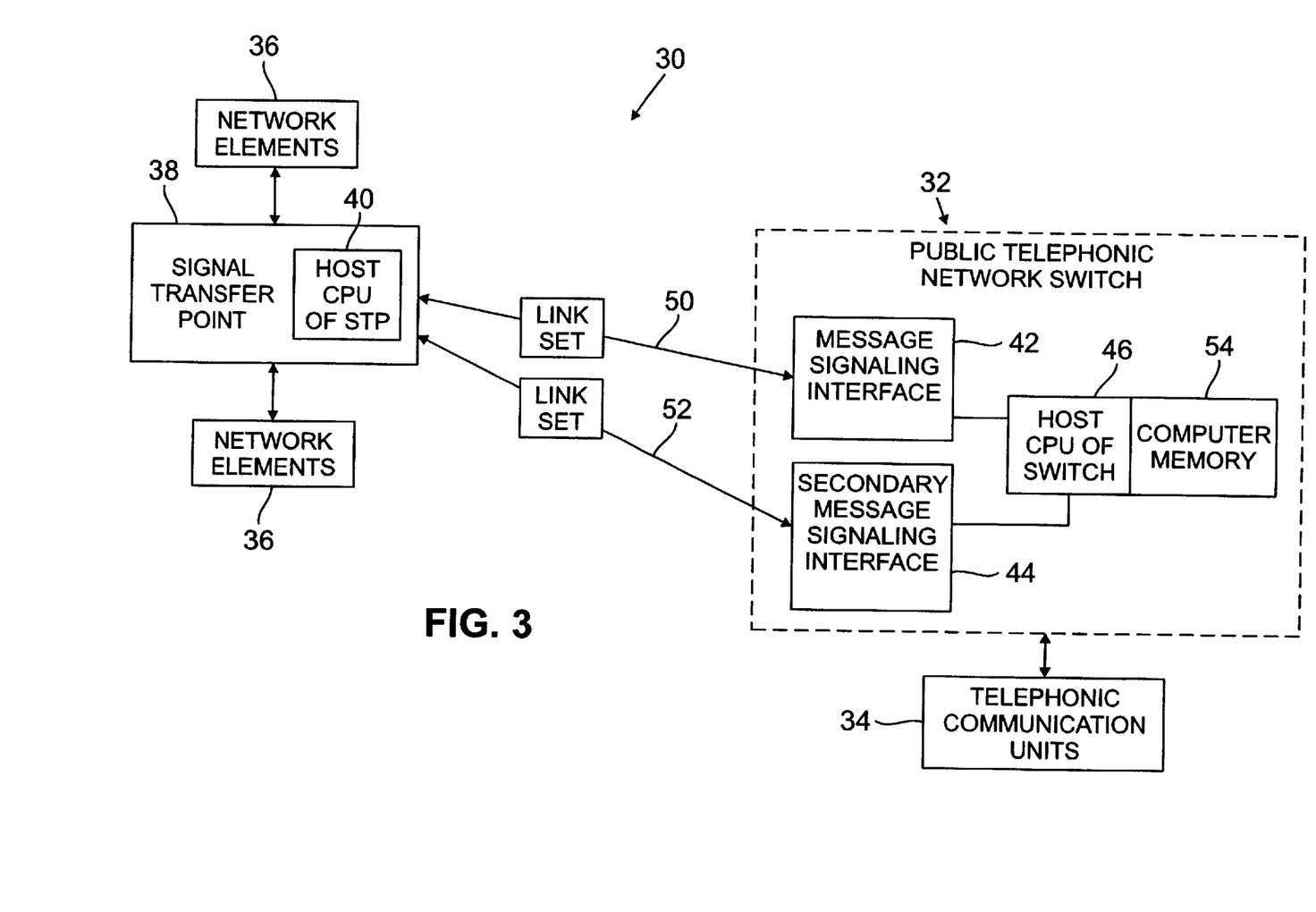
FIG. 3 is a block diagram of the telecommunication system network of the present invention employing parallel link sets from a signal transfer point to independent message signaling interfaces at the same public telephonic network.

FIG. 3 illustrates a telecommunications system network 30 with a computer controlled public telephonic network switch 32 for routing of telephonic signals to telephonic communication units 34, such as telephones, computer devices, telecopiers, modems and the like, connected with the network switch. In operation, the public telephonic network switch also called public switch telephone network (PSTN) switch 32 receives control signaling information from various network elements 36, within the telecommunication system network 30. One such network element, a signal transfer point (STP) 38 having an associated host central processing unit (CPU) 40 is coupled with the multiport network switch 32 and transmits signaling information to the network switch. A signal transfer point is data packet switch in the common channel interoffice signaling (CCIS) packet switched network which transports data messages in a telecommunications system. In the preferred embodiment the signaling information transmitted between the STP 38 and the public telephonic network switch 32 is done so in accordance with Signaling System 7 (SS7) protocol. For further details on SS7 protocol reference can be made to Travis Russell, "Signaling System 7", ISBN 0-07-054991-5, McGraw-Hill, Inc. 1995.

In particular, the public telephonic network switch 32 of the present invention contains two message signaling interfaces 42 and 44 which are independent of one another. In following SS7 protocol, because a single signaling point code is associated with the multiport network switch 32 (i.e. identifying ports on the switch fabric), each of the signaling interfaces 42, 44 are assigned the same point code. One message signaling interface 42 acts as an active interface in which the central processing unit 40 of the STP 38 directs non-voice signaling information from the STP to be transmitted preferably to the message signaling interface 42 under normal operating conditions. Another message signaling interface 44 at the same public telephonic network switch 32 is employed as a secondary or back-up signaling interface and receives signaling information from the STP network element 38 upon the occurrence of certain preselected conditions. A signaling interface is an implementation of the SS7 Message Transfer Part Protocol as it is required at each SS7 network element. The message signaling interface enables the telephonic network switches to communicate via link sets as defined by the network operators. While the one primary message signaling interface 42 follows an active role receiving all transmitted signaling information from the STP 38, the other secondary message signaling interface 44 follows a standby role for receipt of such signaling information upon the occurrence of various preselected conditions within the network. If the primary message signaling interface 42 fails or is taken out of service, host central processing unit (CPU) 46 of the network switch 32 and the central processing unit 40 of the STP 38 are programmed to perform an instantaneous change-over of active/standby roles at the signaling interfaces 42, 44.

As seen in FIG. 3, the signal transfer point 38 is coupled by a plurality of link sets 50 and 52 to both the message signaling interface 42 and the other message signaling interface 44 of the network switch 32. A link set is a group of signaling links that all terminate on the same pair of signaling points. The signal transfer point 38 has electronic circuitry, preferably in the form of programmed central processing unit 40, for transmitting the signaling information between the STP and the network switch 32 across link set 50 connecting message signaling interface 42. The CPU 40 of the STP 38 sends all control signaling information between the STP and the public telephonic network switch 32 across link set 50 to the primary signaling interface 42 under normal operating conditions. As seen in FIG. 3, parallel link sets 50, 52 are provided for each STP 38, with one to each of the two independent message signaling interfaces 42, 44 of the network switch 32. In accordance with the present invention, one data link set 50 is employed for interconnecting the STP 38 with the primary message signaling interface 42 and the other data link set 52 is employed for interconnecting the STP with the other/secondary message signaling interface 44. The link set 52 coupled with the secondary message signaling interface 44 is assigned a lower routing priority than the link set 50 connecting the STP 38 to the primary signaling interface 42. The network operator assigns the routing priority for the link sets and the assigned priority is stored at both the STP 38 and the network switch 32. A storage device, preferably a computer memory 54 associated with the central processing unit 46 of the switch 32, retains the assigned routing priorities for the link sets. A memory storage device associated with the CPU 40 of the STP 38 preferably also retains the assigned routing priority for signaling across the particular link sets 50, 52.

The signal transfer point 38, controlled through its host central processing unit 40, under certain conditions within the network, switches the routing of all signaling information between the STP 38 and the network switch 32 from being transmitted across the one link set 50 to being transmitted across the other link set 52 enabling communication to be established between the STP and the secondary message signaling interface. Preferably, the instantaneous switch of active/standby roles such that the message signaling information being transmitted from the STP 38 to the message signaling interface 42 is routed to the secondary message signaling interface 44 across link set 52 under the preselected conditions of: (a) an operational failure occurring at the message signaling interface 42, (b) initialization taking place at the message signaling interface 42 or (c) a failure at the one link set 50A and a corresponding mate link set 50B (FIG. 4) associated with the link set coupled with the message signaling interface 42. Accordingly, upon the occurrence of an operational failure at the message signaling interface 42, the central processing unit 40 of the STP 38 directs the non-voice control signaling information to be transmitted across back-up link set 52 to the back-up message signaling interface 44 thereby maintaining communication with the network switch 32. If the message signaling interface 42 is being initialized or software update programming is required for the message signaling interface, the STP 38 is set to automatically transmit the signaling information for the network switch 32 to the other message signaling interface 44 across link set 52. Upon initialization, preferably the computer software at a signaling interface of a telephonic switch "reboots" or redefines/rebuilds itself based on the definition which the network operators have placed upon it.

The host central processing unit 40 of the STP 38 switches the routing of all signaling information from being sent across link set 50 to being transmitted across link set 52 coupled with the secondary message signaling interface 44 upon the primary message signaling interface not being in operation. The controlled routing of signaling information upon operational failures or maintenance conditions at signaling interface 42 and link sets 50A, 50B associated therewith or upon field events or system upgrades at the signaling interface 42 enables continued telecommunication signaling at the network telephonic switch 32. Potential isolation of the network switch 32 is significantly reduced thereby increasing its signaling availability and reliability.

In accordance with another aspect of the present invention, upon the return to normal operating conditions, the STP 38 and the multiport network switch 32 are enabled to return the signaling communication between them to be performed via the primary message signaling interface 42. Upon the network switch 32 informing the STP 38 that the message signaling interface 42 has returned to operational service, the CPU 40 of the STP 38 then directs all signaling information in the form of message signaling units to be transmitted across link set 50. Alternatively, upon the occurrence of a failure of the other/secondary message signaling interface 44, the STP 38 likewise directs the signaling information to be re-routed and transmitted back across the one link set 50 coupling the STP 38 and the message signaling interface 42.

The message signaling interfaces 40, 42 are preferably different types of signaling interfaces at the same network switch 32. Alternatively, both message signaling interfaces 40 and 42 at the same network switch 32 may selectively be the same type of signaling interface. For example, signaling interfaces 40 and 42 at the network switch 32 may both selectively be one type of interface or they may both be the same type of interface. In either situation where both message signaling interfaces 40 and 42 are of the same type or of different types, they are both assigned the same signaling point code at the network switch. The system administrator when defining the system assigns a signaling point code for the message signaling interface 40 and the same identical signaling point code is assigned for the other message signaling interface 42 at the same network switch 32. A storage device, preferably a computer memory 54 of the central processing unit 46 at the network switch 32 retains the assigned same signaling point codes for the message signaling interfaces 40 and 42. The public telephonic network switch preferably used is a 5ESS® switch of Lucent Technologies Inc. (formerly AT&T Network Systems), however, other suitable telephonic switches providing out of band signaling network connectivity may be alternatively employed. For further details on the public telephonic network switch employed in the preferred embodiment and for SS7 protocol and architecture, reference can be made to "Switching System Common Channel Signaling 7 Information Guide" Issue 3, 256-002-100, AT&T Network Systems, April 1990, which is incorporated herein by reference.

Figure 4:
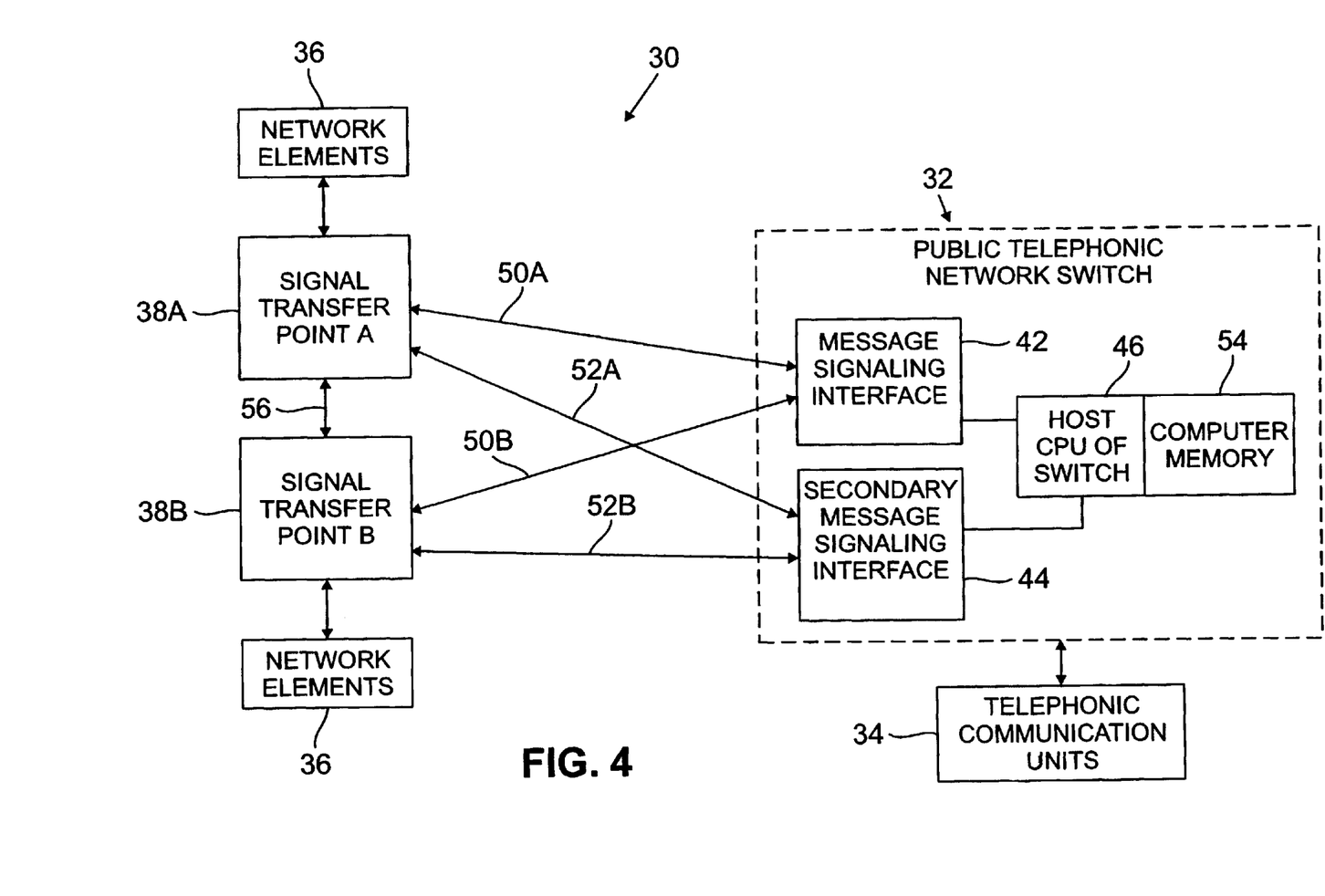
FIG. 4 is a block diagram of another embodiment of the telecommunication system network of the present invention illustrating a public telephonic network switch having network access via dual independent link sets to each of the mate signal transfer points.

Referring now to FIG. 4, the telecommunications system network 30 is shown with a pair of mate signal transfer points (STPs) 38A, 38B each coupled with the single network switch 32 via dual independent link sets 50A, 50B, 52A, 52B. Signal transfer point 38A communicates with its corresponding mate signal transfer point 38B via link set 56. Following SS7 protocol, signal transfer points are deployed in mated pairs. Link set 50A couples STP 38A to the primary message signaling interface 42 and link set 52A couples STP 38A to the secondary message signaling interface 44. The mate STP 38B (for STP 38A) is coupled to message signaling interface 42 via link set 50B and to the secondary message signaling interface via link set 52B. The network deployment, as seen in FIG. 4, has the public telephonic network switch 32 connected to mate STPs 38A, 38B with each of the STPs having parallel link sets and alternate routing.

A signaling link code (SLC) is assigned to each signaling link in the link set between any two signaling points. Every link has a unique SLC assignment, and the two parallel link sets for the STPs 38A, 38B each have non-overlapping subsets of SLC values within the range of sixteen possible values allowed under SS7 protocol. The two SS7 signaling interfaces 42, 44 at the network switch 32 have the same message transfer part (MTP) point code and are independently accessible from the network in active/standby roles via STPs 38A, 38B. The standby/back-up signaling interface 44 is maintained in a "hot" state and under predesignated conditions (such as if the active signaling interface fails or is taken out of service), the network switch 32 and the STP network 38A, 38B perform an instantaneous switch of active/standby roles.

Alternative routing is employed to accommodate the switching requirement for controlling the transmission of signaling information to a particular message signaling interface at the network switch. When a signaling point (e.g. STP or switch) is ready to transmit a message (or MSU), it must identify a link set on which to send the message, which is the next in the route for that message. Network administrators provide a normal route, typically the most direct and efficient link set toward the destination, and one or more alternate routes in priority order. Alternate routing occurs when the normal route is not available (due to various reasons, including failure). Preferably the next highest priority route is then chosen. Alternate routing is generally employed under SS7 protocol to re-route signaling information from across one link set of one signal transfer point to another link set of another (its mated) signal transfer point. The alternate routing scheme is employed in the present invention to route signaling information transmitted across one link set to be transmitted across another link set of the same STP whereby the other or alternate link set is coupled with a different message signaling interface independent of the one interface coupled with the one link set.

Still referring to FIG. 4, under certain conditions within the telecommunications network 30, such as normal operating conditions at the switch 32, signaling information transmitted from STP 38A is routed via link set 50A to the primary message signaling interface 42 at the switch. If the primary link set 50A fails, then alternate routing is employed and the transmission of signaling information is attempted through the mate STP 38B. Signaling information is received at the mate STP 38B and transmission of such information is diverted to link set 50B which is the mate link set of link set 50A. The signaling information is communicated to primary message signaling interface 42 via mate link set 50B upon the failure of link set 50A. If the mate link set 50B fails, then the signaling information is transmitted to the secondary message signaling interface 44 which becomes activated from its standby position. The signal transfer point 38A switches the routing of the signaling information to be sent across the other link set 52A coupled with the secondary message signaling interface 44. The message signaling units are diverted from being sent across link set 50A or its mate link set 50B coupled with signaling interface 42 to now being sent via secondary link set 52A enabling signaling communication to continue with the network switch 32 through the secondary/back-up message signaling interface 44. This prevents the network switch from becoming isolated and maintains the availability of the network switch even upon the occurrence of certain operational failures within the network.

The network 30 of FIG. 3, including the STP 38 and the public switched telephone network switch 32, is initially set up by a system administrator and then enhanced in order to accomplish the functional aspects of the present invention. The network switch 32 originally has a single existing signaling interface 42 and associated link set 50. The signaling links in link set 50 are each assigned a Signaling Link Code (SLC) out of the pool of sixteen (16) SLC values available between every two signaling points. The same SLC value is assigned at each end of the same link.

The system is subsequently defined to accommodate the implementation and deployment of an additional signaling interface 44 and associated link set 52, containing additional signaling links in link set 52. These new links each have a new unique SLC value assigned out of the same pool of sixteen (16) available codes. The switch 32 then has two signaling interfaces and two link sets to each STP (A and B in FIG. 4). STP 38, FIG. 3, provides the same signaling links and includes them in a new link set created by the system administrator. The system administrator then assigns routing of the signaling information to the two link sets in the desired priority order.

Alternatively, in the situation where the existing signaling interface is to be selectively employed as the backup interface and the new additional signaling interface is to function as the primary interface, the existing signaling interface is failed in order that the network switch 32 and STPs 38A, 38B (FIG. 4) divert Message Signaling Units (MSUs) to the newly deployed additional message signaling interface. The routing priorities are optionally changeable by the network administrator at the STP 38 and the switch 32 such that the primary signaling interface 42 is the higher priority than backup message signaling interface 44. Another alternative which may selectively be employed is to retire the existing signaling interface and remove the signaling links. This alternative approach is performed if it is desired to transform a single existing interface at the network switch to two individual new signaling interfaces at the network switch.

In accordance with the present invention a method for controlled routing at a public telephonic network switch which controls call and service information received from various network elements in the telecommunications system network is accomplished by transmitting signaling information from a network element, preferably an STP, to a message signaling interface at the network switch, and sending the signaling information from the network element to another message signaling interface employed as a secondary signaling interface in response to the occurrence of certain reselected conditions. The method is accomplished by electrically coupling the signal transfer point network element 38 to both the message signaling interface 42 and the other or backup interface 44 acting as a secondary message signaling interface. This is preferably accomplished by connecting link set 50 (50A, 50B) from the STP 38 to the message signaling interface 42 (independent of voice circuit connection) and connecting another differing link set 52 (52A, 52B) from the same single STP to the other message signaling interface 44 at the network switch 32. The step of assigning a lower routing priority for the other link set 52, FIG. 3, than the routing priority for the one primary link set 50 is further accomplished.

During normal operating conditions, all control signaling information communicating between the STP 38, FIG. 3, and the network switch 32 which is separate from the voice communication circuits is routed to and transmitted across the one primary link set 50 coupled with the primary message signaling interface 42. Under certain preselected conditions, all the signaling information transmitted between the STP 38 and the network switch 32 is sent across the other link set 52 connecting the STP with the other message signaling interface 44. Preferably the re-routing of the signaling information is performed upon the occurrence of an operational failure at the message signaling interface 42, or upon the initialization of the message signaling interface. Alternatively, transmission of all the signaling information between the STP 38 and network switch 32 occurs across the other link set 52 (52A) at the backup signaling interface 44 in response to a failure of both the one link set 50, FIG. 4, and its associated mate link set 50B connected with the primary message signaling interface 42.

In response to the occurrence of such preselected conditions the routing of the signaling information between the STP 38, FIG. 3, and the network switch 32 is switched from being transmitted across link set 50 and is re-routed to and transmitted across the other link set 52 connected with the other/secondary message signaling interface 44. The step of switching the routing of all the signaling information is automatically and selectively performed in response to the primary message signaling interface 42 not being in operation. All control signaling information between the STP and the network switch is accordingly transmitted across the backup link set 52.

Once transmission of signaling information is established across the other link set 52, the occurrence of certain events within the network will result in the re-directing of all signaling information to be again transmitted back across the primary link set 50. Preferably, if the conditions of an operational failure of the other message signaling interface 44 or the message signaling interface 42 returning to operational service occur, then the step of directing all the signaling information to be transmitted back across the one link set 50 is performed. The transmission of all information between the STP 38 and the network switch 32 via link set 50 to message signaling interface 42 or via link set 52 to the other signaling interface 52 is accomplished in accordance with the Signaling System 7 (SS7) message transfer part protocol.

The message signaling interface 42 is established as one type of signaling interface at the switch 32. A signaling point code is assigned at the memory 54 of the switch 32 as well as at the associated memory of the CPU 40 of the STP 38 for the message signaling interface 42. Each network element (switch and STP) stores the signaling point code for itself and the other network elements it is connected with. Preferably, the message signaling interface is one type of message signaling interface. The other message signaling interface 44 may selectively be established as a different type of signaling interface. The same signaling point code for the one message signaling interface 42 is also assigned in memory 54 for the other message signaling interface 44 at the network switch. Alternatively, the message signaling interface 42 and the other message signaling interface 44 may selectively be both the same type of signaling interfaces having the same point code at the network switch. Every network element has an assigned signaling point code. The same signaling point code is assigned to each message signaling interface 42, 44 because it has been found to be highly impractical to change the pre-assigned point code for a public switched telephone network switch 32 because it is used to identify the voice circuits that interconnect all the other network switching elements.

Figure 5:
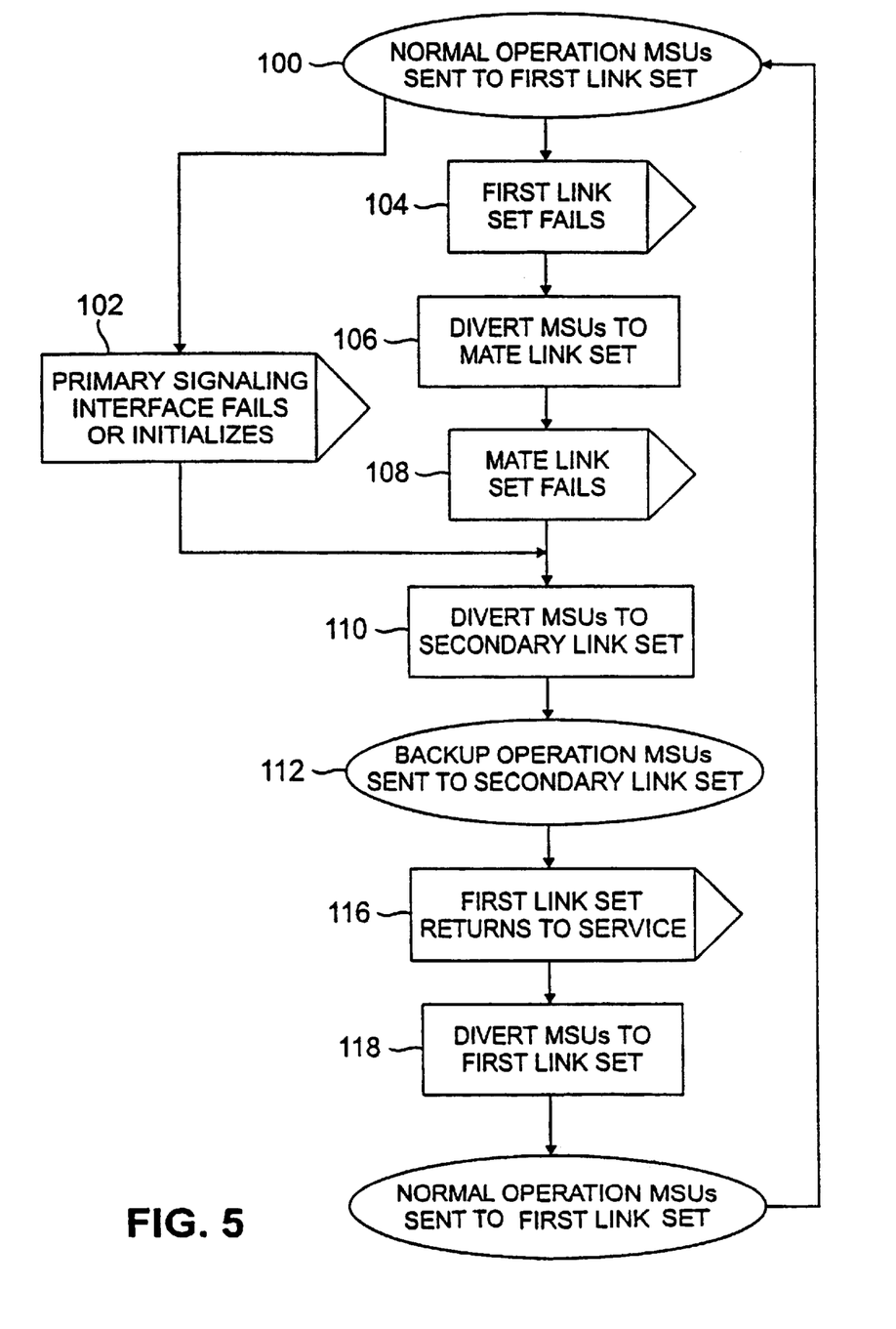
FIG. 5 is a flow diagram illustrating the steps performed at the signal transfer point and the public telephonic network switch for the transmission of signaling information across the link sets during normal and back-up operation.

Referring now to FIG. 5, a flow diagram illustrating the controlled routing of signaling communication between the signal transfer point 38 and signaling interfaces 42, 44 of the network switch 32 during normal and backup operations is shown. In step 100 the telephonic network switch 32, FIG. 3, is operating under normal conditions. During normal operation the message signaling units (MSUs) from the STP 38 are sent to the first link set 50 coupled with the primary message signaling interface 42. A message signaling unit carries a message corresponding to the information part or packet of the High Level Data Link Control (HDLC) protocol frame along with a message transfer part corresponding to the HDLC frame header. If the primary signaling interface 42 fails or initializes as seen in step 102, FIG. 5, then in step 110 the MSUs are diverted to the secondary link set 52, FIG. 3. When the signaling interface initializes, regeneration (or rebooting) of the dynamic information occurs based on new software implementation or upon the signaling interface recovering from a failure.

Additionally, in step 104, FIG. 5, if the first link set 50A, FIG. 4, fails during normal signaling operation, then the process flows to step 106 and the MSUs are diverted by the SS7 message transfer part protocol executed through CPU 40 to its corresponding mate link set 50B, FIG. 4, coupled with the primary signaling interface. In the event of the mate link set 50B failing in step 108, FIG. 5, the processing flows to step 110 and the message signaling units are re-routed across the secondary link set 52 (52A) to the other/backup message signaling interface 42 of the network switch 32.

Once all the signaling information is switched from being transmitted along link set 50, FIG. 3, and received at signaling interface 42 to now, under the backup operation, being transmitted to the other/backup message signaling interface 44, the MSUs are sent to the secondary link set 52 coupled with the backup signaling interface as seen in step 112, FIG. 5. If the first link set 50, FIG. 3, returns to normal service in step 116, FIG. 5, in this situation as seen in step 118, the MSUs are directed to the first link set 50, FIG. 3. Upon this occurrence the signaling communication returns to normal operation and the MSUs are sent from the STP 38 to the first link set 50 thereby enabling all signaling information to be transmitted from the STP to the one primary message signaling interface 42 at the public telephonic network switch 32.

While a detailed description of the preferred embodiment of the invention has been given, it should be appreciated that many variations can be made thereto without departing from the scope of the invention as set forth in the appended claims.

What is claimed is:

1. A telecommunications system network comprising:
   a public telephonic network switch;
   a first message signaling interface at the public telephonic network switch for receipt of signaling information from a network element within the telecommunications system network; and
   a second message signaling interface at the public telephonic network switch employed as a secondary signaling interface for receipt of signaling information from the network element within the telecommunications system network upon the occurrence of certain preselected conditions, wherein the network element includes a signal transfer point that is coupled to the first message signaling interface and the second message signaling interface.

2. The telecommunications system network of claim 1 including a plurality of link sets coupling the signal transfer point with the public telephonic network switch.

3. The telecommunications system network of claim 1 in which the plurality of link sets includes
   a first link set interconnecting the signal transfer point with the first message signaling interface at the public telephonic network switch, and
   a second link set interconnecting the signal transfer point with the second message signaling interface at the public telephonic network switch.

4. The telecommunications system network of claim 3 in which the signal transfer point includes electronic circuitry for transmitting all signaling information between the signal transfer point and the public telephonic network switch across the first link set.

5. The telecommunications system network of claim 4 in which said electronic circuitry includes means for sending all signaling information between the signal transfer point and the public telephonic network switch across the first link set under normal operating conditions.

6. The telecommunications system network of claim 5 in which said signal transfer point includes means for switching the routing of all signaling information between the signal transfer point and the public telephonic network switch from being transmitted across the first link set to being transmitted across the second link set such that all signaling information between the signal transfer point and the public telephonic network switch is transmitted across the second link set.

7. The telecommunications system network of claim 6 in which the switching means switches the routing of all signaling information from across the first link set to the second link set upon the first message signaling interface not being in operation.

8. The telecommunications system network of claim 6 in which said preselected conditions includes at least one of the conditions of: (a) operational failure of the first message signaling interface, (b) initialization of the first message signaling interface and (c) failure of the first link set and a mate link set associated with the first link set.

9. The telecommunications system network of claim 8 including means for directing all signaling information to be transmitted back across the first link set upon the first message signaling interface returning to operational service.

10. The telecommunication system network of claim 6 in which the second link set is assigned a lower routing priority than the first link set.

11. The telecommunications system network of claim 3 in which the signaling information is transmitted between the signal transfer point and the public telephonic network switch in accordance with Signaling System 7 protocol.

12. The telecommunications system network of claim 1 in which the first message signaling interface and the second message signaling interface are different types of message signaling interfaces.

13. The telecommunications system network of claim 12 including a storage device at the public telephonic network switch for retaining an assigned signaling point code for the first message signaling interface and for retaining the signaling point code for the second message signaling interface at the public telephonic network switch.

14. The telecommunications system network of claim 1 in which the first message signaling interface and the second message signaling interface are both the same type of message signaling interface at the public telephonic network switch.

15. The telecommunications system network of claim 14 including a storage device at the public telephonic network switch for retaining a signaling point code for the first message signaling interface and for retaining the signaling point code for the second message signaling interface.

16. In a telecommunications system network including a public telephonic network switch for controlling telephonic call and service information received from the network, a method for controlled routing at the public telephonic network switch comprising the steps of:

transmitting signaling information from a network element within the telecommunications system network to a first message signaling interface at the public telephonic network switch; and sending the signaling information from the network element within the telecommunications system network to a second message signaling interface employed as a secondary signaling interface in response to the occurrence of certain preselected conditions, wherein the network element includes a signal transfer point that is coupled to both the first message signaling interface and the second message signaling interface.

17. The method of claim 16 in which the step of coupling includes the steps of connecting a first link set from the signal transfer point to the first message signaling interface, and connecting a second link set from the signal transfer point to the second message signaling interface.

18. The method of claim 17 including the step of routing all signaling information communicating between the signal transfer point and the public telephonic network switch to be transmitted across the first link set.

19. The method of claim 18 in which the step of transmitting all signaling information across the first link set is performed under normal operating conditions at the public telephonic network switch.

20. The method of claim 19 including the step of switching the routing of all signaling information between the signal transfer point and the public telephonic network switch from being transmitted across the first link set to be re-routed and transmitted across the second link set coupled with the second message signaling interface such that all signaling information between the signal transfer point and the public telephonic network switch is transmitted across the second link set.

21. The method of claim 20 in which the step of switching the routing of all signaling information is performed in response to the first message signaling interface not being in operation.

22. The method of claim 20 in which said preselected conditions includes at least one of the conditions of: (a) operational failure of the first message signaling interface, (b) initialization of the first message signaling interface and (c) failure of the first link set and a mate link set associated with the first link set.

23. The method of claim 22 including the step of directing all signaling information to be transmitted back across the one link set coupling the signal transfer point and the first message signaling interface upon the first message signaling interface returning to operational service.

24. The method of claim 20 including the step of assigning a lower routing priority for the second link set than for the first link set.

25. The method of claim 17 including the step of transmitting the signaling information between the signal transfer point and the public telephonic network switch in accordance with Signaling System 7 protocol.

26. The method of claim 17 including the steps of establishing the first message signaling interface as a first type of signaling interface at the network switch, and establishing the second message signaling interface as a second type of message signaling interface at the network switch.

27. The method of claim 26 including the steps of assigning a signaling point code for the first message signaling interface, and assigning the signaling point code second message signaling interface.

* * * * *